United States Patent
Hämmerle et al.

(10) Patent No.: US 11,242,276 B2
(45) Date of Patent: Feb. 8, 2022

(54) METHOD FOR PRODUCING A GLASS-FIBRE PREFORM WITH A CORE OF A POLYGONAL CORE CROSS SECTION

(71) Applicant: LEONI KABEL GMBH, Roth (DE)

(72) Inventors: Wolfgang Hämmerle, Jena (DE); Jörg Kötzing, Jena (DE)

(73) Assignee: LEONI KABEL GMBH, Roth (DE)

( * ) Notice: Subject to any disclaimer, the term of this patent is extended or adjusted under 35 U.S.C. 154(b) by 16 days.

(21) Appl. No.: 16/635,879

(22) PCT Filed: Aug. 24, 2018

(86) PCT No.: PCT/EP2018/072851
§ 371 (c)(1),
(2) Date: Jan. 31, 2020

(87) PCT Pub. No.: WO2019/042877
PCT Pub. Date: Mar. 7, 2019

(65) Prior Publication Data
US 2020/0180995 A1 Jun. 11, 2020

(30) Foreign Application Priority Data
Aug. 29, 2017 (DE) .......................... 102017119798.2

(51) Int. Cl.
*C03B 37/012* (2006.01)

(52) U.S. Cl.
CPC .. *C03B 37/01234* (2013.01); *C03B 37/01211* (2013.01); *C03B 37/01248* (2013.01); *C03B 2203/12* (2013.01)

(58) Field of Classification Search
None
See application file for complete search history.

(56) References Cited

U.S. PATENT DOCUMENTS

| 9,296,639 B2 | 3/2016 | Schoetz et al. |
| 2003/0031444 A1* | 2/2003 | Croteau ............ C03B 37/01217 385/127 |

(Continued)

FOREIGN PATENT DOCUMENTS

| DE | 2426590 A1 | 12/1975 | ........... C03B 37/012 |
| DE | 102009004756 A1 | 2/2011 | ........... C03B 37/012 |

(Continued)

OTHER PUBLICATIONS

An Office Action (in German), dated Mar. 7, 2018, issued by the German Patent Office for Applicant's corresponding German Patent Application No. DE102017119798.2, filed Aug. 29, 2017.

(Continued)

*Primary Examiner* — Lisa L Herring
(74) *Attorney, Agent, or Firm* — Bodner & O'Rourke, LLP; Gerald T. Bodner; Christian P. Bodner

(57) ABSTRACT

The invention relates to a method for producing a glass-fibre preform with a core of a polygonal cross section by using a rod-in-tube method and comprising the method steps of: providing a core rod (1) of a polygonal core rod cross section (2), producing a sectored sandwich tube (3) from a starting tube (4), wherein the lateral surface of the starting tube (4) is slit in the longitudinal direction into a series of outer segments (8), and so the tube cross section of the starting tube (4) is subdivided into a series of sectors of a circle (7), inserting the core rod (1) into the sectored sandwich tube (3) and aligning it and, in the case of one embodiment, inserting the core rod (1) and the sectored sandwich tube (3) into an outer casing tube (10) with a complete annular cross section and melting the sectored sandwich tube (3) and possibly the outer casing tube (10) onto the sectored sandwich tube (3), wherein the outer segments (8) of the sectored sandwich (Continued)

Figure 1:
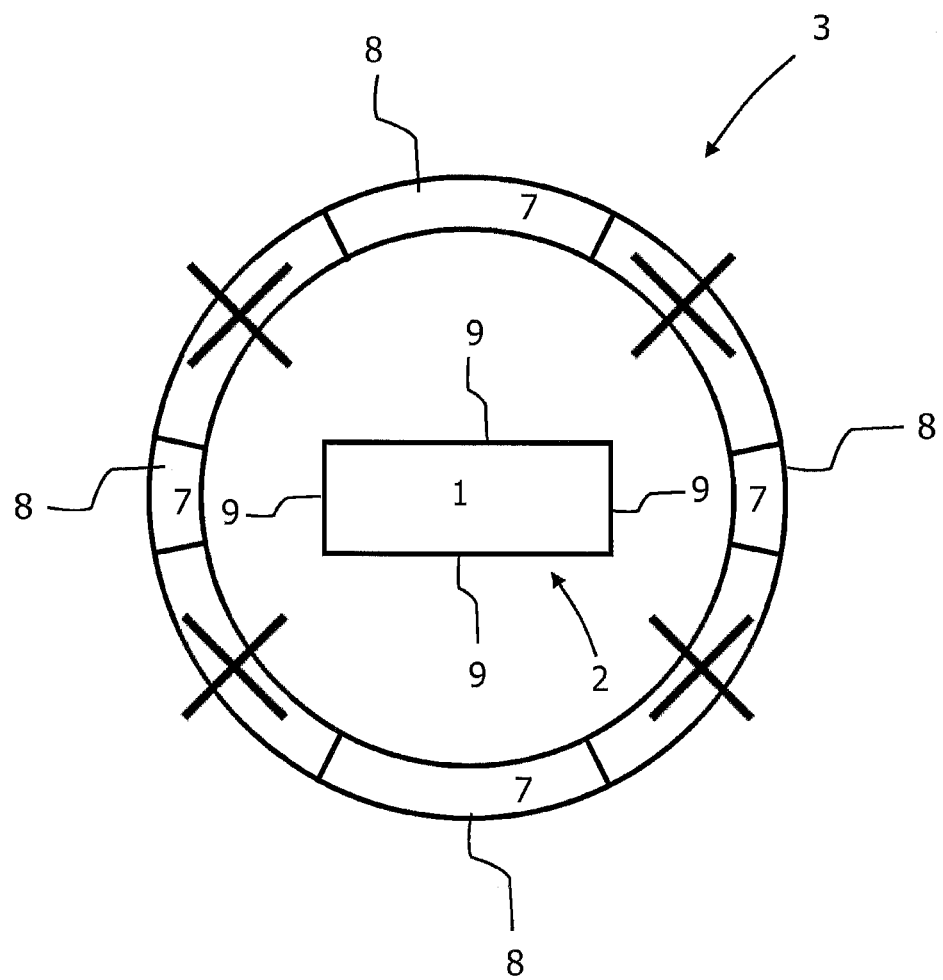

tube (3) are fused to the respective side surfaces (9) of the core rod (1).

10 Claims, 10 Drawing Sheets

(56) References Cited

U.S. PATENT DOCUMENTS

| | | | |
|---|---|---|---|
| 2004/0139765 A1* | 7/2004 | Hirano | C03B 37/01228 65/412 |
| 2004/0179796 A1 | 9/2004 | Jakobsen et al. | |
| 2012/0047951 A1* | 3/2012 | Dannoux | C03B 23/0476 65/25.3 |
| 2015/0218036 A1* | 8/2015 | Schotz | C03B 37/01291 65/386 |

FOREIGN PATENT DOCUMENTS

| | | | | |
|---|---|---|---|---|
| DE | 102012107344 B3 | | 5/2014 | ............ C03B 19/01 |
| JP | 2003020241 A | * | 1/2003 | ....... C03B 37/01466 |
| JP | 2006219355 A | | 8/2006 | ........... C03B 37/012 |
| WO | WO-2004071977 A1 | * | 8/2004 | ....... C03B 37/01217 |

OTHER PUBLICATIONS

The Notification Concerning Transmittal of International Preliminary Report on Patentability (Chapter I of the Patent Cooperation Treaty), in English, dated Mar. 12, 2020, which was issued by the International Bureau of WIPO in Applicant's corresponding international PCT application having Serial No. PCT/EP2018/072851, filed on Aug. 24, 2018.

The English translation of the International Preliminary Report on Patentability (Chapter I of the Patent Cooperation Treaty), dated Mar. 3, 2020, which was issued by the International Bureau of WIPO in Applicant's corresponding international PCT application having Serial No. PCT/EP2018/072851, filed on Aug. 24, 2018.

The Written Opinion of the International Searching Authority, in English, dated Dec. 4, 2018, which was issued by the International Bureau of WIPO in Applicant's corresponding international PCT application having Serial No. PCT/EP2018/072851, filed on Aug. 24, 2018.

The International Search Report, in English, dated Dec. 4, 2018, which was issued by the International Bureau of WIPO in Applicant's corresponding international PCT application having Serial No. PCT/EP2018/072851, filed on Aug. 24, 2018.

* cited by examiner

METHOD FOR PRODUCING A GLASS-FIBRE PREFORM WITH A CORE OF A POLYGONAL CORE CROSS SECTION

The invention relates to a method for producing a glass-fibre preform with a core having a polygonal core cross-section. The polygonal core cross-section, for example, has a rectangular shape, but it can also be of any polygonal shape.

Glass-fibre preforms with a polygonal core cross-section are glass rods with diameters in the centimetre range and lengths up to the metre range. These are drawn in a fibre drawing tower to polygonal core fibres, especially rectangular core fibres. The fibre diameter is finally in the range of approx. 50 to approx. 500 µm. As with all optical fibres, there must be a sufficiently high refractive index difference between the fibre core and the surrounding fibre cladding to allow waveguiding in the core region. The refractive index in the core is higher than in the surrounding cladding.

The production of polygonal core preforms and especially rectangular core preforms is currently carried out according to two different processes:

In the so-called rod-in-tube process, a rod is inserted into a tubular glass body (tube) and subsequently fused or otherwise combined with it to form the preform. In this case, the rod consists of a glass material, especially quartz glass, with a polygonal cross-section. The tube is then pushed over the rod and both components are then fused bubble-free in a graphite furnace or in an oxyhydrogen gas flame.

In order to enable waveguiding in the later glass fibre, the rod must have a higher refractive index than the tube. The refractive index of rod and tube can be adjusted by means of refractive-index-increasing and refractive-index-reducing dopants. Often only one of the preform parts is doped to change the refractive index. In particular, it is also possible to produce rectangular core preforms from an undoped quartz glass core and a fluorine-doped and thus refractive-index-reduced cladding.

For low-attenuation waveguiding in the later glass fibre, the cladding layer must have a sufficiently large layer thickness. A layer thickness of at least 10 times the transmission wavelength is generally sufficient for this purpose. Normally, for cost reasons, the cladding layer thickness around the transfer core is only selected as thick as necessary.

The main problem with the rod-in-tube process is that the tube must be pushed over the polygonal, especially rectangular, core rod at the beginning of the process. Taking into account the cross-sectional relationships between the core rod and the tube and the resulting dimensioning of the two components for problem-free sliding together, the length of the inner circular arc of the cladding tube must always be significantly greater than the circumference of the polygonal core. This deviation is particularly pronounced in rectangular cores.

During the subsequent cladding process, the length of the inner circular arc of the tube never shrinks so much that a homogeneous and bubble-free interface between the core and cladding tube is created during fusion. Instead, the tube folds on the polygonal core surface during cladding and no clean interface is formed. This problem becomes more pronounced the more the polygonal core deviates from the circular shape and the fewer corners it has. Rectangular cores are therefore particularly affected by these disadvantages. However, this problem also usually occurs with higher-numbered polygon cross-sections of the cores.

The boundary surface between core and cladding thus generally still contains a large number of bubbles. The thickness of the cladding layer, which is determined by the tube wall thickness, also changes due to the formation of wrinkles. In addition, the refractive index of the tube also changes as a result of the mechanical stresses in the glass material associated with the formation of wrinkles.

During the cladding process, the cladding tube also touches the rectangular core rod first at the rectangular core corners and exerts pressure on these corners. The result is that the corners are rounded. This kind of edge grinding is undesirable, as it ultimately distorts the core cross-section to a considerable extent.

The rod-in-tube process is described for example in DE 10 2009 004 756 A1.

The direct separation process is also not a favourable alternative to the rod-in-tube process.

In the direct deposition process, a polygonal core rod, in particular a core rod with a rectangular cross-section, is first produced. This core rod then serves as substrate material in a POVD process, for example, and is directly encapsulated in a POVD system. Compared to other external deposition processes (OVD, VAD), the plasma external process (POVD) has the advantage that a sufficiently high concentration of dopants can be achieved in the deposited layers by means of a plasma process. During the plasma deposition process the rectangular core rod rotates and the distance of the rod surface to the plasma torch changes periodically. Due to the variable distance of the plasma torch to the core rod surface, the deposition conditions on the rectangular core rod change over the rod circumference.

At the rod edges the surface temperature reaches such high values that the rod edges are rounded off in an undesirable way. In contrast, the surface temperatures in the central area of the rod surfaces are so low that the deposited glass layer does not melt completely transparent. In these rod areas, bubbles may occur later during fibre drawing, which make the fibre unusable. The direct separation process is described, for example, in DE 10 2012 107 344 B3.

It is therefore the object to specify a method for the production of a glass-fibre preform with a core with a polygonal core cross-section, in which the disadvantages mentioned are sustainably reduced and eliminated. In particular, the method should ensure a high homogeneity and quality of the interface between the polygonal core and preform cladding and exclude deformation of the core, especially rounding of the core corners in the core cross-section.

The object is solved by a method for producing a glass-fibre preform with a core with a polygonal core cross-section using a rod-in-tube method with the following method steps.

A core rod with a polygonal core rod cross-section is provided. Furthermore, a sectored sandwich tube is produced from a starting tube. In this process, the lateral surface of the starting tube is slit in the longitudinal direction into a series of outer segments, so that the tube cross-section of the starting tube is divided into a series of circular sectors. The core rod is then threaded and aligned in the sectored sandwich tube. Then the sectored sandwich tube is fused onto the side faces of the core rod.

The method according to the invention is based on the basic idea of enclosing the core rod with the polygonal cross-section in a sectored sandwich tube and, instead of an entire enclosing tube, only the individual sectors of the sandwich tube are fused onto the core rod. In this way, the sections to be melted are applied to the corresponding surfaces of the polygonal core rod, which reliably prevents deformation of the corners of the core rod cross-section.

In one embodiment of the method, the sectored sandwich tube and the core rod inside it are threaded into an outer casing tube with a complete circular ring cross-section. In the subsequent melting step, the outer casing tube is melted onto the sectored sandwich tube, causing the outer segments of the sectored sandwich tube to fuse with the respective side faces of the core rod.

In this variation of the method, melting is thus carried out via the outer casing tube. During the melting process, the outer casing tube presses the sectored sandwich tube evenly onto the core rod surfaces.

In one design of the method, the starting tube for the sectored sandwich tube has an inner layer with the refractive index of the core rod, a tube body with a reduced refractive index and/or an outer layer with the refractive index of the outer casing tube, wherein the inner layer and/or the outer layer serve as fusion-promoting auxiliary layers for the individual outer segments.

In one embodiment of the method, the starting tube is slotted in such a way that non-slit end areas remain at its tube ends, fixing the position of the outer segments. In this way, the sandwich tube forms a precisely defined arrangement in the position of its parts.

The slitting of the starting tube can be done in particular by means of a laser cutting process. This enables high-precision and clean cuts.

Appropriately, the inner bottom length of each circular sector of the respective outer segments corresponds essentially to the width of a corresponding side face of the polygonal core rod.

In an appropriate embodiment of the method, a vacuum is applied to the inner volume of the outer casing tube during melting using the outer casing tube. In particular, this applied vacuum can be in the range of at least 5 mbar. Preferably a vacuum with at least 10 mbar is applied.

In one design of the method, the finished glass-fibre preform is ground to a designated cross-sectional shape after the melting process. In this way, a cross-sectional shape of the manufactured preform, possibly determined by the polygonal shape of the core rod, can be corrected to a required cross-sectional shape, thus anticipating a later desired fibre cross-section.

In one embodiment, the core rod has a rectangular core cross-section.

In a further design of the method, the outer casing tube is fused onto the sectored sandwich tube in a graphite furnace or in a flame device.

Figure 2:
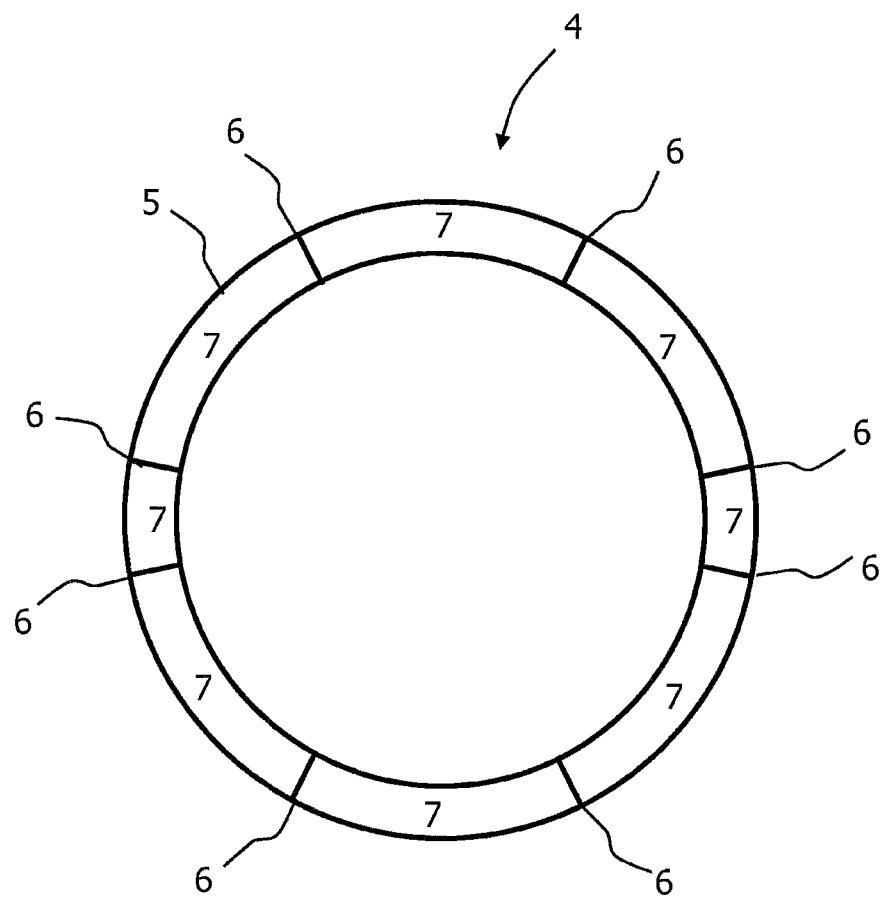
Figure 3:
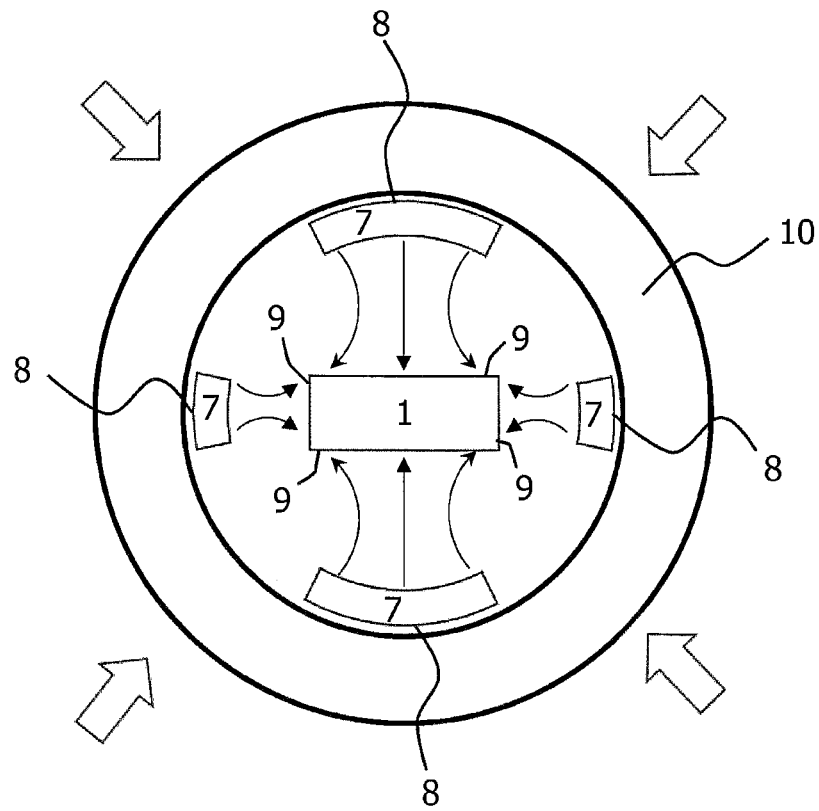
Figure 3:
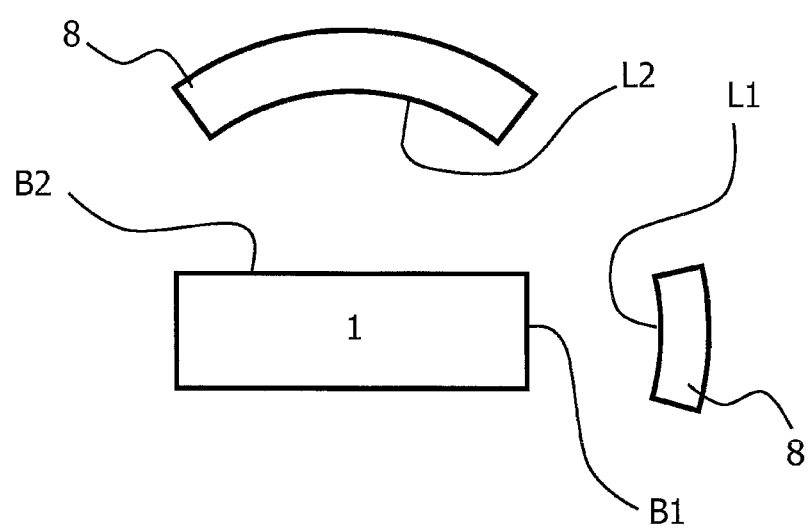
Figure 4:
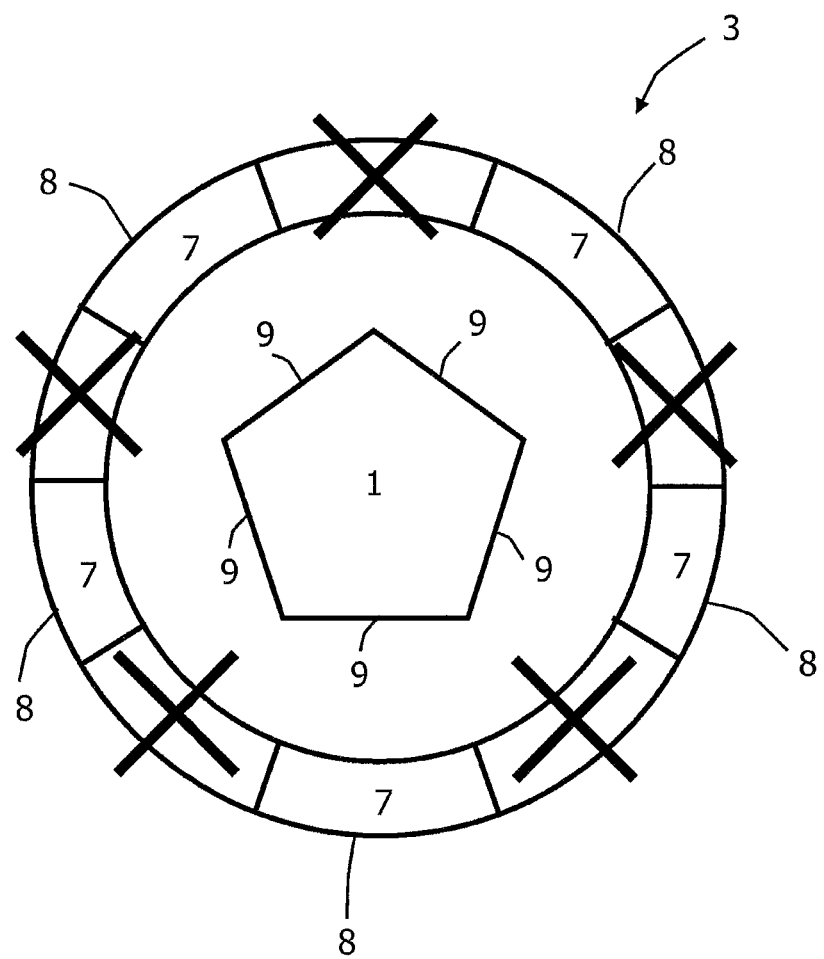
Figure 5:
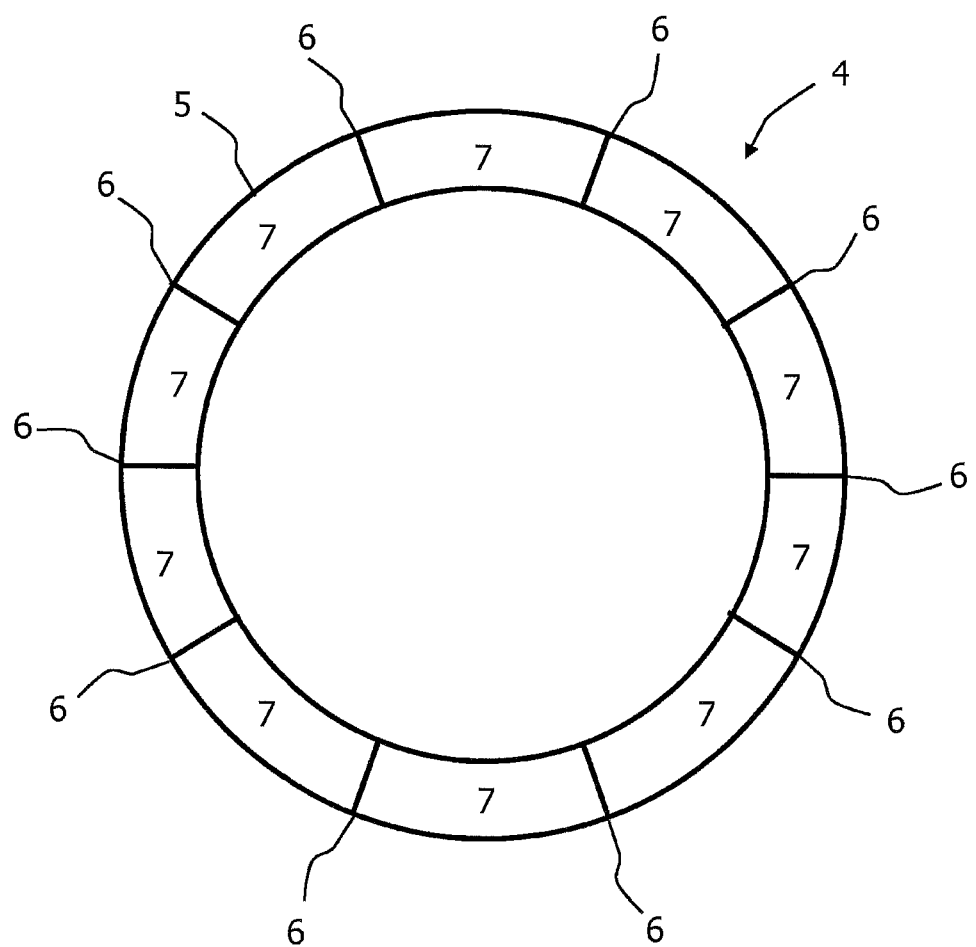
Figure 6:
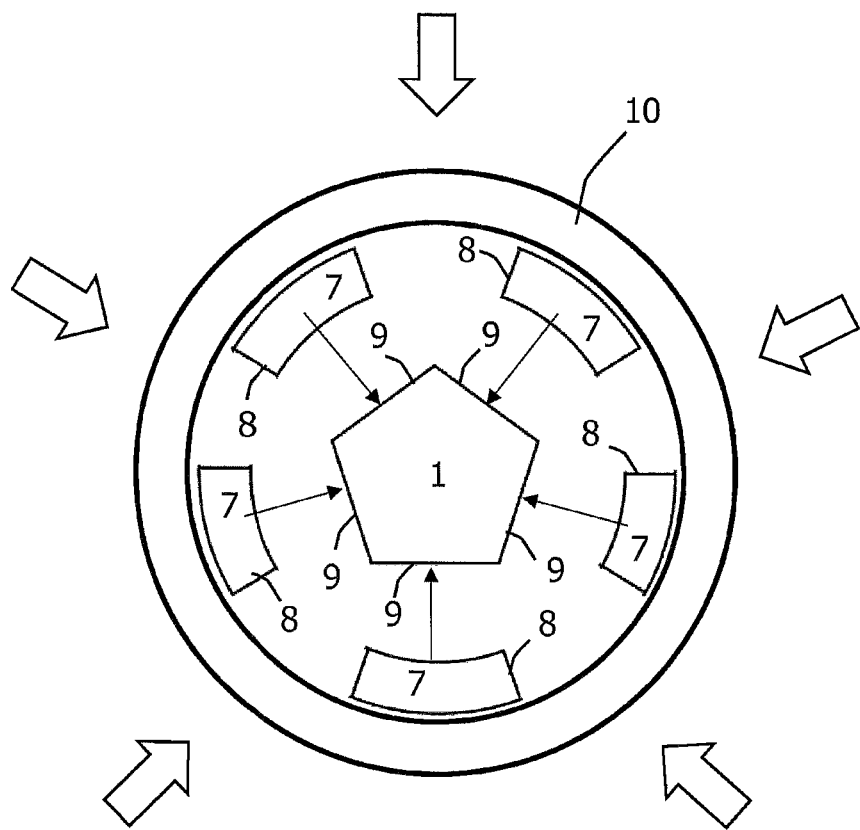
Figure 6A:
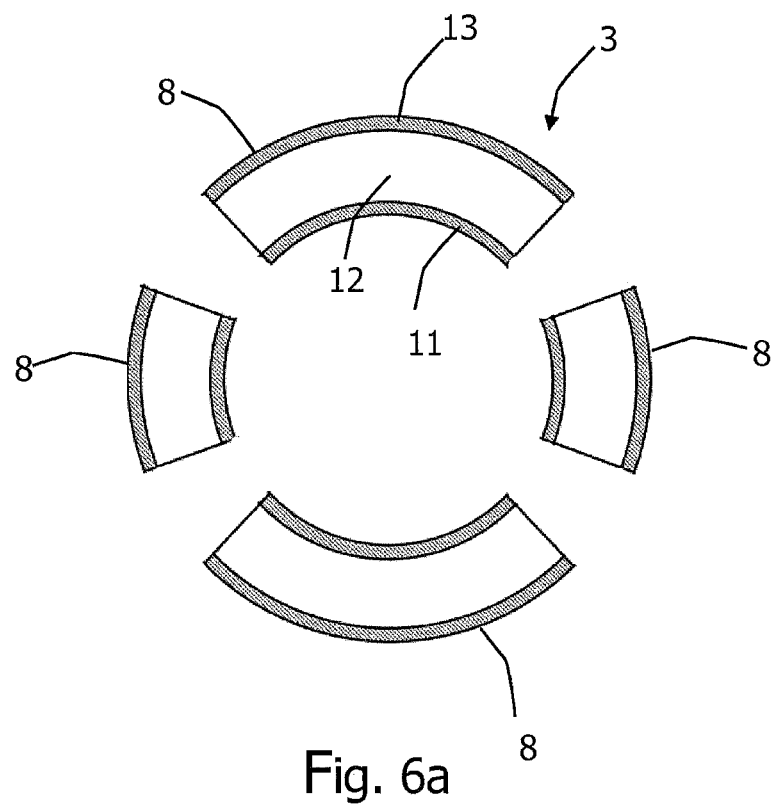
Figure 6B:
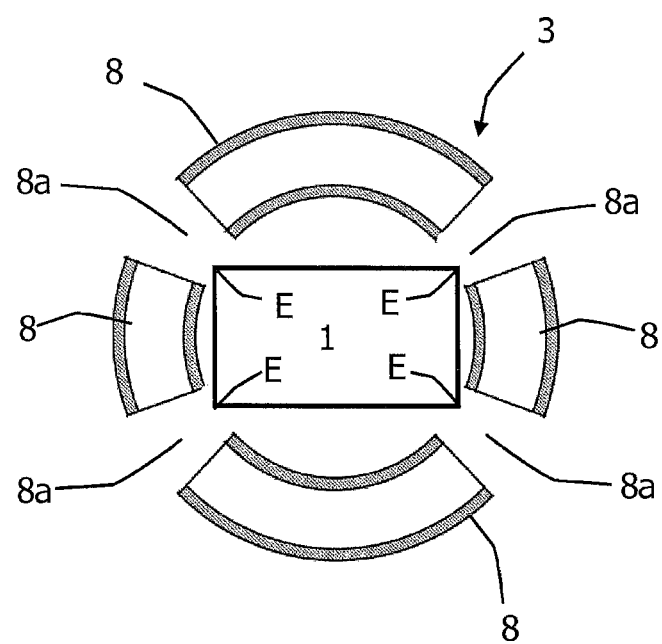
Figure 7:
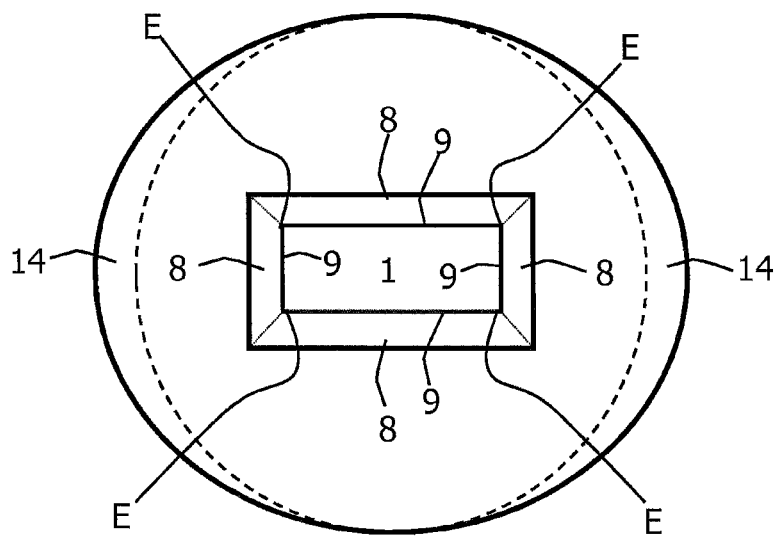
Figure 8:
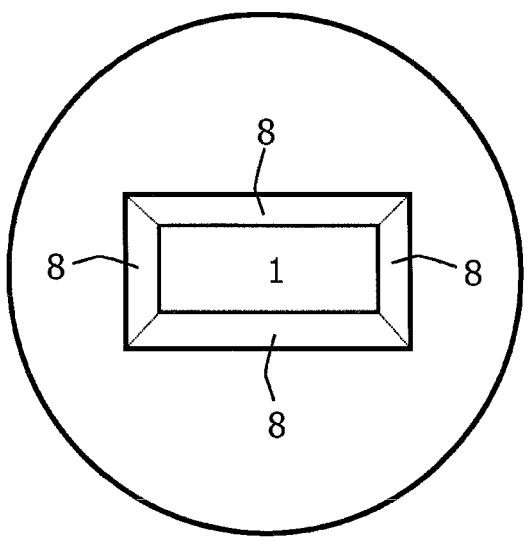
Figure 9:
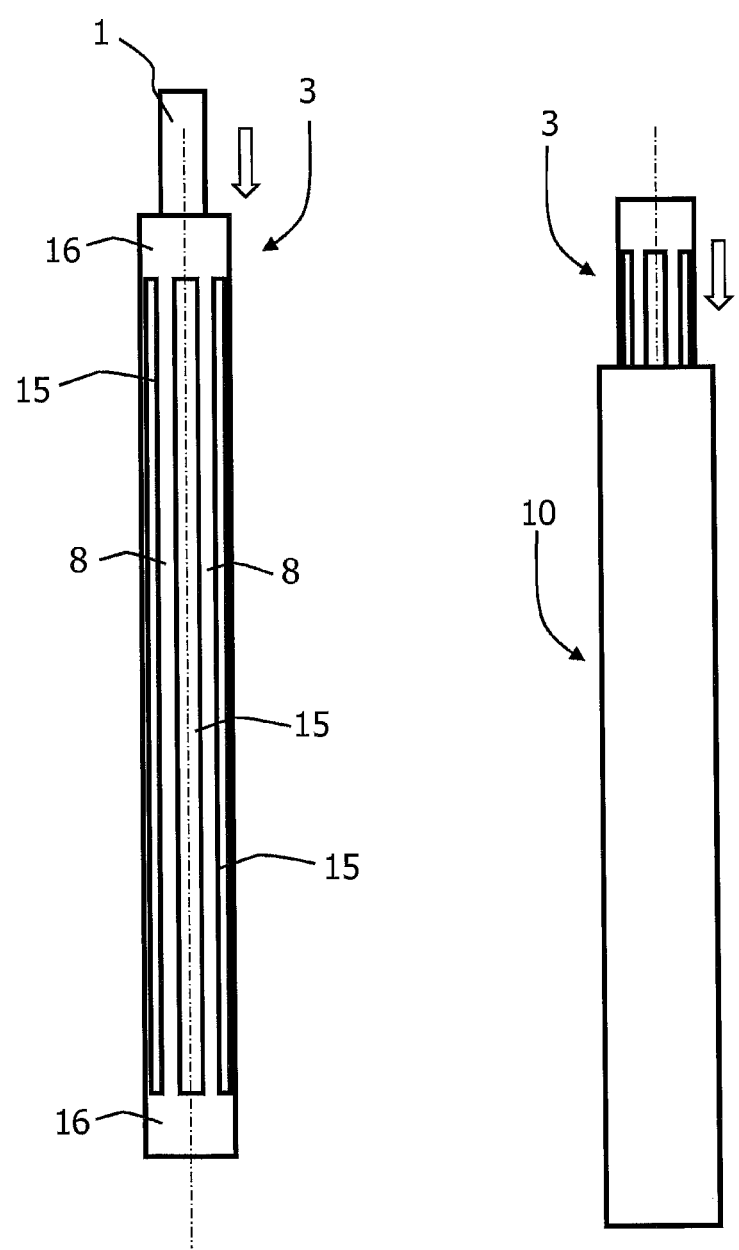
Figure 10:
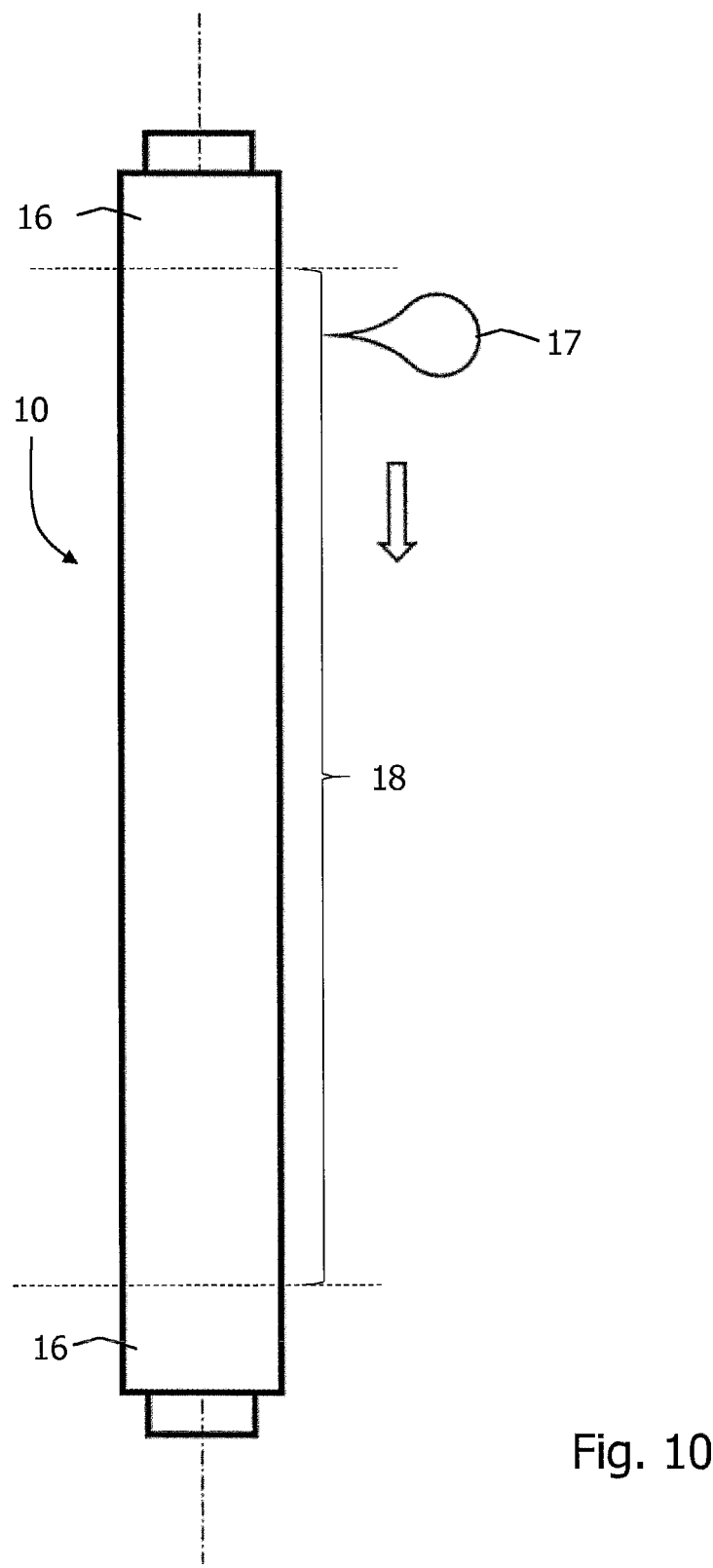

The method according to the invention shall be explained in more detail in the following on the basis of exemplary embodiments and designs. The enclosed figures serve to clarify this, wherein:

FIG. 1 shows a representation of a core rod with a first exemplary polygonal rectangular core rod cross-section with an associated sandwich tube in cross-section, FIG. 2 shows the starting tube belonging to the sandwich tube from FIG. 1 with the positions for the insertion of the separation points for realising the slits in the cross-section, FIG. 3 shows the arrangement of core rod and sandwich tube from FIG. 1 in an outer casing tube in cross-section, FIG. 4 shows a representation of a core rod with a polygonal core rod cross-section in the form of an equilateral pentagon with an associated sandwich tube in cross-section FIG. 5 shows the starting tube belonging to the sandwich tube from FIG. 4 with the positions for the insertion of the separation points for realising the slits in the cross-section, FIG. 6 shows the arrangement of core rod and sandwich tube from FIG. 4 in an outer casing tube in cross-section, FIG. 6*a* shows an embodiment of the sectored sandwich tube with a layered structure consisting of an inner layer, tube body and outer layer in cross-section, FIG. 6*b* shows a representation of a core rod cross-section with its corners partially projecting into the area of the sectored sandwich tube, FIG. 7 shows a glass-fibre preform in cross-section obtained from the arrangement in FIG. 1 after melting, FIG. 8 shows the preform cross-section shown in FIG. 7 after a final finishing operation, FIG. 9 shows a sandwich tube in a side view and an illustration of the threading of the sandwich tube into the outer casing tube FIG. 10 shows a representation of the melting of the overall arrangement.

FIG. 1 shows a representation of a core rod with a first exemplary polygonal core rod cross-section with an associated sandwich tube in cross-section. The core rod 1 has a polygonal core cross-section 2, which in the present case is rectangular. However, the polygonal core cross-section does not necessarily have to be rectangular; the number of corners and sides is basically unlimited. In particular, hexagonal or triangular polygonal cross-sections can be provided and the polygonal core cross-section can also be a pentagon, as will be shown in a further example below.

The core rod with the rectangular polygon cross-section is threaded into a sandwich tube 3 here. The sandwich tube is already sectored here. It is manufactured according to FIG. 2 from a starting tube 4, which has an annular tube cross-section 5. The starting tube 4 is cut open in the longitudinal direction along a series of dividing lines 6 and is thereby slit. In particular, a laser cutting process can be used. As a result of this slitting process, the annular cross-section 5 of the starting tube 4 is divided into a series of circular sectors 7. When carrying out the slitting process, some of the circle sectors 7 are removed from the tube cross-section 5. A comparison of the illustration from FIG. 1 with the illustration from FIG. 2 shows this, wherein the distant circle sectors 7 in FIG. 1 have been marked with an overdrawn cross to illustrate the slitting process.

The sandwich tube 3 thus sectored consists in its cross-section of the circle sectors 7 remaining after the slitting process and in its longitudinal direction of an alternating sequence of slit sections and remaining outer segments 8, which correspond to the remaining circle sectors. Each of the remaining outer segments 8 is thus assigned a respective side face 9 of core rod 1 in the case of the threaded arrangement of core rod 1 and sandwich tube 3.

This overall arrangement of sectored sandwich tube 3 and threaded core rod 1 can then be combined in this configuration by a melting process, wherein the remaining outer segments 8 fuse with the respective side face 9 of the core rod 1.

In the example presented here, the arrangement consisting of the sectored sandwich tube 3 and the core rod 1 located therein is threaded into an outer casing tube 10 before final fusion, as shown in the cross-sectional view in FIG. 3.

This overall arrangement finally shown in FIG. 3 is merged together. For the geometry of the core rod and the outer segments, the condition must be fulfilled that the inner arc lengths L1 and L2 of the respective outer segments 8 of each circle sector correspond to the width B1 and B2 of the respective side face 9 of the core rod 1 and essentially correspond to it.

During the fusion process, the casing tube 10 is fused onto the outer segments 8 of the sectored sandwich tube 3, wherein the outer segments 8 in turn are fused onto the side faces 9 of the core rod 1 in the course of this process and thus connect with these side faces. The result of this melting process produces a glass-fibre preform with a polygonal core cross-section and a cladding surrounding the polygonal core cross-section made of the material of the sectored sandwich tube and a surrounding sheath made of the material of the outer casing tube 10.

It should be noted that the outer casing tube is not absolutely necessary for the fusion process as such. The fusion between the outer segments and the side faces of the core rod can also be performed on a non-segmented arrangement consisting of the core rod and the sectored sandwich tube. In the course of the fusion process, the outer segments soften and are driven against the side faces and fused therewith without the compressive action of the casing tube.

FIGS. 4, 5 and 6 illustrate the production steps explained above in their application to a core rod 1 with a core rod cross-section with a five-fold polygonal contour. All previous production steps are carried out in the same way in the example shown here. For a core rod with a five-fold core rod cross-section, correspondingly additional separation sections 6 are required in the starting tube 4, because in this case five outer segments 8 must be fused onto the side faces 9 of the core rod 1. In addition, the side faces 9 of core rod 1 are of equal size due to the five-fold and equilateral cross-sectional geometry. For this reason, the outer segments 8 are also the same size in this case. As mentioned in the previous example, the outer casing tube 10 can be omitted or, depending on requirements, used in the production of the glass-fibre preform.

The sectored sandwich tube 3 can have a layered structure as shown in FIG. 6a. In the example shown here, the sectored sandwich tube and thus each of the outer segments 8 has an inner layer 11, a tube body 12 and an outer layer 13. The inner layer as well as the outer layer are applied to the starting tube 4 before the starting tube is slit. Both the inner layer and the outer layer serve as auxiliary layers that promote fusion. The inner layer has in particular the refractive index of the material of the core rod, the outer layer the refractive index of the outer casing tube, if the casing tube is used. The outer layer can also be omitted if the outer casing tube is omitted.

The tube body 12 has the refractive index required for subsequent light conduction in the fibre core, which is lower than the core refractive index. To influence the refractive index in the individual layers, coating and doping processes can be applied to the starting rod. Fluorine in particular can be used as a refractive index-lowering dopant for the tube body of the starting rod.

FIG. 6b illustrates the advantageous aspect of the method according to the invention, namely that in the method according to the invention, the cross-section of the core rod 1 in the sectored sandwich tube 3 can be larger than is possible with a non-sectored enveloping tube in the rod-in-tube method known from the prior art. When using the sectored sandwich tube, the corner areas E of the cross-section of core rod 1 can extend into the interspaces 8a between the individual outer segments. In such a case, the starting tube for the production of the sectored sandwich tube is widened at least in one of the non-slit end sections in an inner diameter such that the enlarged core rod can be passed through. These expansions can, in particular, have a groove-like design and allow positioning and guidance for the core rod during its threading.

The configuration shown in FIG. 6b reduces the distance to be covered by the outer segments 8 to the side faces 9 of the core rod, so that the precise fusion between the core rod and the sectored sandwich tube is considerably facilitated.

FIG. 7 shows the fused glass-fibre preform, based on the arrangement of the components from FIGS. 1 to 3 in cross-section. The core rod 1 now forms the core of the preform, the individual outer segments 8 cover the side faces 9 of the core rod and thus adjoin the core in the form of a surrounding cladding. The outer casing tube then forms an outer jacket of the glass-fibre preform.

This structure makes it clear why it is very important when carrying out the method that the inner arc length of the outer segments each coincides with the corresponding width of the side face of the core rod. In such a case, a bubble-free melting of the individual outer segments on the side faces of the core rod is achieved, while the corners E of the core rod in cross-section do not round off during the fusion process, but retain their original shape.

FIG. 7 also shows that the outer contour of the cross-section of the preform produced during the melting process deviates from a circular shape because of the rectangular shape of the core cross-section. If a circular contour of the preform is required, the segments 14 deviating from the circular shape can be removed in a subsequent processing step, so that a circular preform cross-section as shown in FIG. 8 is achieved.

FIG. 9 and FIG. 10 show essential method steps and the components used in them in a side view. FIG. 9 shows the sectored sandwich tube 3, the threading of the core rod 1 into the sandwich tube and the threading of the sandwich tube 3 and the core rod situated therein into the outer casing tube 10. FIG. 10 shows the fusion process taking place on the casing tube and the threaded components.

As already mentioned, the sandwich tube 3 is slit in its longitudinal direction and divided into individual outer segments 8. The slit sections 15, which divide the outer segments 8 from each other, do not reach to the ends of the sectored sandwich tube. The end sections of the sandwich tube have non-slit end areas 16 which stabilize the arrangement of the outer segments in their position. The length of the end sections depends, for example, on the total length of the sandwich tube, the proportion and length of the slit sections 15 and the wall thickness of the sectored sandwich tube.

When threading the core rod 1 into the sectored sandwich tube 3, the cross-sections of the core rod and the sectored sandwich tube are first adjusted azimuthally to each other in such a way that the outer segments 8 of the sandwich tube come to lie exactly opposite the corresponding side faces of the core rod. After this first threading step, the complete arrangement of sandwich tube and core rod is inserted into the outer casing tube 10 without contact in the example shown here.

In the final fusion process according to FIG. 10, this entire arrangement is heated, for example, in a graphite furnace or by means of an oxyhydrogen flame 17 or a comparable flame device. In addition, a pressure in the range of at least 5 mbar, but preferably at least 10 mbar, is applied to the inner volume of the outer casing tube to achieve the collapse of the fused arrangement. Under these conditions, this structure collapses in the area of the outer segments 8 to form the glass-fibre preform. The glass-fibre preform collapsed in this way is then shortened in those sections in which the non-slit stabilising end areas 16 of the sectored sandwich tube 3 are located. This shortening can take place before or after a possible reworking of the preform jacket and its standardization to a circular cross-sectional periphery. In the remaining central area 18 of the collapsed preform, the desired structure of the cross-section of the preform is then present.

The method according to the invention was explained by way of example. Further embodiments are obtained within the scope of the activities of a person skilled in the art and from the subclaims.

LIST OF REFERENCE NUMERALS

1 Core rod
2 Polygonal core cross-section
3 Sectored sandwich tube
4 Starting tube
5 Annular cross-section
6 Dividing line
7 Circle sector
8 Outer segment
8a Interspace
9 Side face of the core rod
10 Outer casing tube
11 Inner layer
12 Tube body
13 Outer layer
14 Segment deviating from the circular shape
15 Slit section
16 Stabilizing end range
17 Oxyhydrogen gas flame
18 Central area

The invention claimed is:

1. Method for producing a glass fibre preform having a core with a polygonal core cross-section by using a rod-in-tube method and comprising the following method steps:
   providing a core rod with a polygonal core rod cross-section,
   producing a sectored sandwich tube from a starting tube, wherein a lateral surface of the starting tube is slit in the longitudinal direction into a series of outer segments, so that a tube cross-section of the starting tube is subdivided into a series of circular sectors, wherein the starting tube is slit in such a way that non-slit end areas stabilize a position of the outer segments remaining at its tube ends,
   threading and aligning the core rod into the sectored sandwich tube,
   melting of the outer segments of the sectored sandwich tube onto the respective side faces of the core rod.

2. Method according to claim 1, characterized in that
   a threading of the sectored sandwich tube and the core rod located therein into an outer casing tube with a complete annular cross-section takes place, wherein in the subsequent melting step a melting of the outer casing tube onto the sectored sandwich tube takes place with a fusion of the outer segments of the sectored sandwich tube with the respective side faces of the core rod.

3. Method according to claim 2, characterized in that during the melting of the outer casing tube, a vacuum is applied to an inner volume of the outer casing tube.

4. Method according to claim 3, characterized in that the applied vacuum in the inner volume of the outer casing tube is at least 5 mbar, preferably at least 10 mbar.

5. Method according to claim 2, characterized in that the starting tube for the sectored sandwich tube has an inner layer with the refractive index of the core rod, a refractive index-reduced tube body and/or an outer layer with the refractive index of the outer casing tube, wherein the inner layer and/or the outer layer serve as fusion-promoting auxiliary layers for the individual outer segments and/or the outer casing tube.

6. Method according to claim 2, characterized in that the melting of the outer casing tube to the arrangement consisting of the core rod and the sectored sandwich tube is carried out in a graphite furnace or in a flame device.

7. Method according to claim 1, characterized in that the slitting of the starting tube is done by means of a laser cutting process.

8. Method according to claim 1, characterized in that an inner arc length of each circular sector of the respective outer segments is substantially equal to a width of a corresponding side face of the core rod.

9. Method according to claim 1, characterized in that after the melting process a cross-sectional shape correction is carried out.

10. Method according to claim 1, characterized in that the core rod has a rectangular core cross-section.

* * * * *